(12) United States Patent  
Sujan et al.

(10) Patent No.: US 10,001,070 B2
(45) Date of Patent: Jun. 19, 2018

(54) MULTI-FUEL ENGINE CONTROLS INCLUDING MULTI-FACTOR COST OPTIMIZATION

(71) Applicant: Cummins Inc., Columbus, IN (US)

(72) Inventors: Vivek Anand Sujan, Columbus, IN (US); J. Stephen Wills, Columbus, IN (US); J. Steven Kolhouse, Columbus, IN (US); Anant Puri, Columbus, IN (US)

(73) Assignee: Cummins Inc., Columbus, IN (US)

( * ) Notice: Subject to any disclaimer, the term of this patent is extended or adjusted under 35 U.S.C. 154(b) by 39 days.

(21) Appl. No.: 15/262,442

(22) Filed: Sep. 12, 2016

(65) Prior Publication Data

US 2017/0074201 A1 Mar. 16, 2017

Related U.S. Application Data

(60) Provisional application No. 62/217,100, filed on Sep. 11, 2015.

(51) Int. Cl.
*F02D 41/00* (2006.01)
*F02M 43/00* (2006.01)
(Continued)

(52) U.S. Cl.
CPC ....... *F02D 41/0025* (2013.01); *F02D 19/061* (2013.01); *F02D 19/0647* (2013.01);
(Continued)

(58) Field of Classification Search
CPC ............. F02D 41/0025; F02D 41/0027; F02D 2200/501; F02D 2200/701; F02D 2200/702; F02D 2200/703; F02D 41/266; F02D 19/0605; F02D 19/0697; F02M 43/00; F02M 7/133; F02C 7/22; F17C 5/06
(Continued)

(56) References Cited

U.S. PATENT DOCUMENTS 7,093,588 B2 8/2006 Edwards
8,267,064 B2 9/2012 Martin et al.
(Continued)

FOREIGN PATENT DOCUMENTS

WO 2014133819 9/2014

OTHER PUBLICATIONS

Hu et al., Theoretical analysis of lowest limits of NOx formation of methane-air mixtures, 2011, IEEE, p. 1-5.*
(Continued)

*Primary Examiner* — McDieunel Marc
(74) *Attorney, Agent, or Firm* — Taft Stettinius & Hollister LLP

(57) ABSTRACT

One exemplary embodiment is a system comprising a multi-fuel engine structured to selectably combust varying proportions of a first type of fuel and a second type of fuel, and an electronic control system structured to control the provision of at least one of the first type of fuel and the second type of fuel to the engine using a multi-factor cost optimization. The multi-factor cost optimization may account for a plurality of factors including one or more environment factors, location factors, mission factors, warranty factors, operator-specified factors and/or fleet-specified factors.

20 Claims, 4 Drawing Sheets

(51) Int. Cl.
*F02D 19/06* (2006.01)
*F02D 19/08* (2006.01)
*F02M 26/05* (2016.01)
*F02M 26/06* (2016.01)
*F02M 26/25* (2016.01)
*F02M 26/24* (2016.01)

(52) U.S. Cl.
CPC ....... *F02D 19/0692* (2013.01); *F02D 19/081* (2013.01); *F02M 26/05* (2016.02); *F02M 26/06* (2016.02); *F02M 43/00* (2013.01); *F02D 41/0027* (2013.01); *F02D 2200/501* (2013.01); *F02D 2200/701* (2013.01); *F02D 2200/702* (2013.01); *F02D 2200/703* (2013.01); *F02M 26/24* (2016.02); *F02M 26/25* (2016.02); *Y02T 10/36* (2013.01)

(58) Field of Classification Search
USPC .......................................................... 701/2
See application file for complete search history.

(56) References Cited

U.S. PATENT DOCUMENTS

| | | | |
|---|---|---|---|
| 9,739,419 B2* | 8/2017 | Donnelly | F17C 5/06 |
| 2010/0252135 A1* | 10/2010 | Moxley | F02M 7/133 |
| | | | 137/872 |
| 2011/0288738 A1* | 11/2011 | Donnelly | F02D 19/0697 |
| | | | 701/99 |
| 2012/0167859 A1* | 7/2012 | Basmaji | F02D 19/0605 |
| | | | 123/456 |
| 2013/0305730 A1* | 11/2013 | Donnelly | F02C 7/22 |
| | | | 60/772 |
| 2014/0365049 A1 | 12/2014 | Cook | |
| 2014/0366839 A1 | 12/2014 | Sivasubramanian et al. | |
| 2014/0366840 A1 | 12/2014 | Sivasubramanian et al. | |
| 2014/0373822 A1 | 12/2014 | Rosswurm et al. | |
| 2016/0290257 A1* | 10/2016 | Bzymek | F02D 41/266 |

OTHER PUBLICATIONS

John D. Withrow, Jr., Engine options for the car of tomorrow: Competing internal and external combustion engines, as well as electrics, are considered as contenders, 1977, IEEE, p. 57-62.*

Tang et al., Research on the Three Different Kinds of Technologies to Achieve Flameless Combustion and Their Applications, 2009, IEEE, p. 1-4.*

Tantayakom, Fuel Option for Gas Turbine, 1995, IEEE, p. 124-127.*

* cited by examiner

MULTI-FUEL ENGINE CONTROLS INCLUDING MULTI-FACTOR COST OPTIMIZATION

BACKGROUND

The present application relates generally to controls for multi-fuel engines and more particularly but not exclusively to multi-fuel engine controls including multi-factor cost optimization. Existing attempts to provide controls for multi-fuel engines suffer from a number of shortcomings and disadvantages. There remains a significant need for the unique apparatuses, methods, systems and techniques disclosed herein.

DISCLOSURE OF EXEMPLARY EMBODIMENTS

For the purposes of clearly and concisely summarizing and describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

Unique multi-fuel engine controls and apparatuses, methods and systems relating to the same are disclosed. One exemplary embodiment is a system comprising a multi-fuel engine structured to selectably combust varying proportions of a first type of fuel and a second type of fuel, and an electronic control system structured to control the provision of at least one of the first type of fuel and the second type of fuel to the engine using a multi-factor cost optimization. The multi-factor cost optimization may account for a plurality of factors including one or more environmental factors, location factors, mission factors, warranty factors, operator-specified factors and/or fleet-specified factors. Further embodiments, forms, objects, features, advantages, aspects, and benefits shall become apparent from the following description and drawings.

DETAILED DESCRIPTION OF ILLUSTRATIVE EMBODIMENTS

Figure 1:
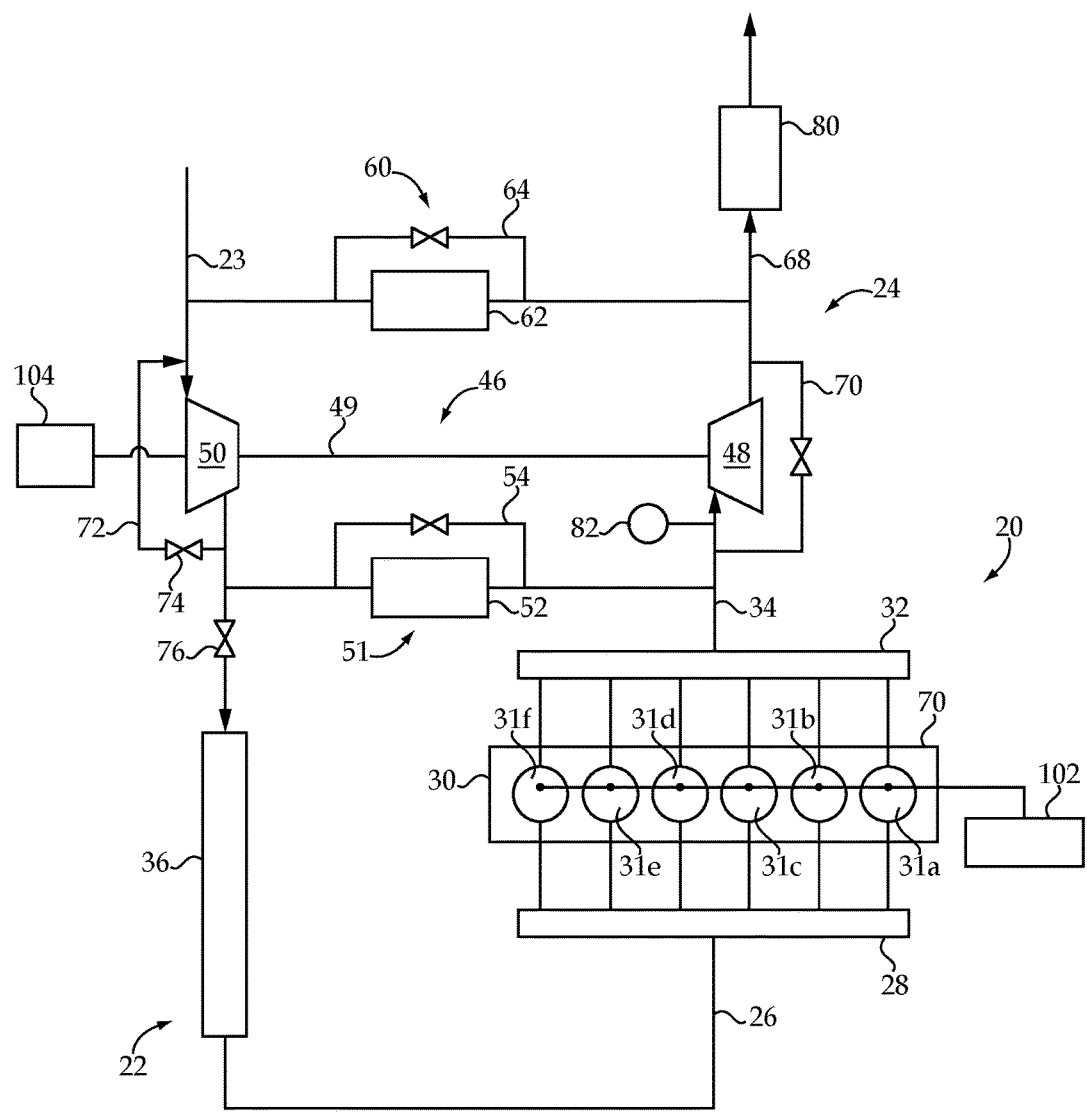
FIGS. 1 and 2 schematically illustrate certain aspects of an exemplary multi-fuel internal combustion engine system.
Figure 2:
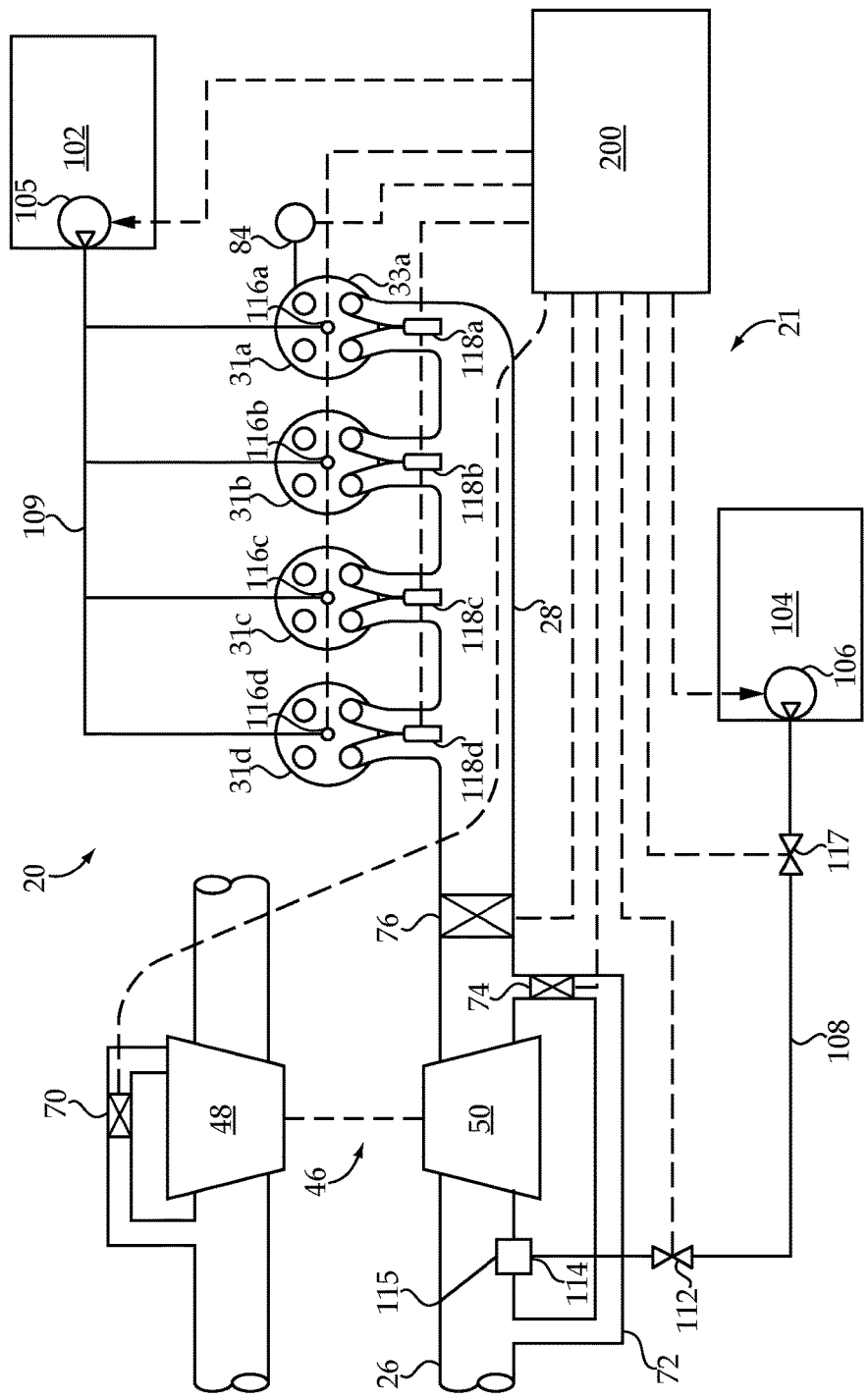

With reference to FIGS. 1 and 2, there are illustrated certain aspects of a multi-fuel engine system 20 and multi-fuel fueling system 21. System 20 is operable to combust a variable proportion of two or more types of fuel. System 21 is operable to provide fueling to engine 30 from a first fuel source 102 and a second fuel source 104 in a variable proportion. Fuel source 102 and fuel source 104 store a first fuel and a second fuel, respectively, and the first fuel and the second fuel are of different types. Systems 20 and 21 are illustrated and described as providing two types of fuel for combustion, however, additional fuel sources may also be included to store and provide additional different types of fuel for combustion.

Engine system 20 includes engine 30 connected with an intake system 22 for providing a charge flow to engine 30 and an exhaust system 24 for output of exhaust gases. In certain embodiments, the engine 30 comprises a lean combustion engine such as a diesel cycle engine that uses a primary or first fuel that is a liquid fuel such as diesel fuel and a secondary or second fuel that is a gaseous fuel. The gaseous fuel can be, for example, natural gas, bio-gas, commercially available gas, methane, ethane, propane (LPG), butane, ethanol, producer gas, field gas, nominally treated field gas, well gas, nominally treated well gas, liquefied natural gas (LNG), compressed natural gas, landfill gas, condensate, coal-bed methane (CBM), liquid fuels that are readily vaporized (such as gasoline), and/or mixtures of these. Other types of first and second fuels may also be utilized. In certain embodiments, the first fuel is a fuel suitable for lean burning, and the second fuel is a fuel that utilizes stoichiometric or near-stoichiometric combustion except when combined with the first fuel during a multi-fueling operation.

Engine 30 includes an engine block 70 that at least partially defines the cylinders 31*a*, 31*b*, 31*c*, 31*d*, 31*e*, 31*f* (collectively referred to as cylinders 31.) A plurality of pistons (not shown) are slidably disposed within respective cylinders 31 to reciprocate between a top-dead-center position and a bottom-dead-center position. Each of the cylinders 31, its respective piston, and the cylinder head form a combustion chamber. In the illustrated embodiment, engine 30 includes six such combustion chambers configured in an in-line arrangement. However, it is contemplated that engine 30 may include a greater or lesser number of combustion chambers and that the combustion chambers may be disposed in an "in-line" configuration, a "V" configuration, a "W" configuration, a flat configuration, or in any other suitable configuration.

In one embodiment, engine 30 is a four stroke engine. That is, for each complete engine cycle (i.e., for every two full crankshaft rotations), each piston of each cylinder 31 moves through an intake stroke, a compression stroke, a combustion or power stroke, and an exhaust stroke. Thus, during each complete cycle for the depicted six cylinder engine, there are six strokes during which air is drawn into individual combustion chambers from intake supply conduit 26 and six strokes during which exhaust gas is supplied to exhaust manifold 32.

The engine 30 includes cylinders 31 connected to the intake system 22 to receive a charge flow and connected to exhaust system 24 to release exhaust gases produced by combustion of the first and/or second fuels. Exhaust system 24 may provide exhaust gases to a turbocharger 46, although a turbocharger is not required. In still other embodiments, multiple turbochargers are included to provide high pressure and low pressure turbocharging stages that compress the intake flow.

Exhaust system 24 can be connected to intake system 22 with one or both of a high pressure exhaust gas recirculation (EGR) system 51 and a low pressure EGR system 60. EGR systems 51, 60 may include a cooler 52, 62 and bypass 54, 64, respectively. In other embodiments, one or both of EGR systems 51, 60 are omitted. When provided, EGR system(s) 51, 60 provide exhaust gas recirculation to engine 30 in certain operating conditions. In any EGR arrangement during at least certain operating conditions, at least a portion of the exhaust output of cylinder(s) 31 is recirculated to the engine intake system 22. In the high pressure EGR system 51, the exhaust gas from the cylinder(s) 31 takes off from exhaust system 24 upstream of turbine 48 of turbocharger 46 and combines with intake flow at a position downstream of compressor 50 of turbocharger 46 and upstream of an intake manifold 28 of engine 30. In the low pressure EGR system 60, the exhaust gas from the cylinder(s) 31a-31f takes off from exhaust system 24 downstream of turbine 48 of turbocharger 46 and combines with intake flow at a position upstream of compressor 50 of turbocharger 46. The recirculated exhaust gas may combine with the intake gases in a mixer (not shown) of intake system 22 or by any other arrangement. In certain embodiments, the recirculated exhaust gas returns to the intake manifold 28 directly.

Intake system 22 includes one or more inlet supply conduits 26 connected to an engine intake manifold 28, which distributes the charge flow to cylinders 31 of engine 30. Exhaust system 24 is also coupled to engine 30 with an engine exhaust manifold 32. Exhaust system 24 includes an exhaust conduit 34 extending from exhaust manifold 32 to an exhaust valve. In the illustrated embodiment, exhaust conduit 34 extends to turbine 48 of turbocharger 46. Turbine 48 includes a valve such as controllable wastegate 70 or other suitable bypass that is operable to selectively bypass at least a portion of the exhaust flow from turbine 48 to reduce boost pressure and engine torque under certain operating conditions. In another embodiment, turbine 48 is a variable geometry turbine. In other embodiments, the exhaust valve is an exhaust throttle and/or wastegate.

In one embodiment, exhaust conduit 34 is flow coupled to exhaust manifold 32, and may also include one or more intermediate flow passages, conduits or other structures. Exhaust conduit 34 extends to turbine 48 of turbocharger 46. Turbocharger 46 may be any suitable turbocharger known in the art, including fixed-geometry turbocharger, variable-geometry turbine turbochargers and waste-gated turbochargers. Turbocharger 46 may also include multiple turbochargers. Turbine 48 is connected via a shaft 49 to compressor 50 that is flow coupled to inlet supply conduit 26.

Exhaust from turbine 48 is provided to outlet conduit 68 which provides exhaust to an aftertreatment system 80. The aftertreatment system 80 may include, for example, oxidation devices (DOC), particulate removing devices (DPF, CDPF), constituent absorbers or reducers (SCR, AMOX, LNT), reductant systems, as well as additional or alternate exhaust aftertreatment components.

Compressor 50 receives fresh air flow from intake air supply conduit 23. Second fuel source 104 may also be flow coupled at or upstream of the inlet to compressor 50 or downstream of compressor 50, as discussed further below. Intake system 22 may further include a compressor bypass 72 that connects a downstream or outlet side of compressor 50 to an upstream or inlet side of compressor 50. Compressor bypass 72 includes a control valve 74 that is selectively opened to allow charge flow to be returned to the inlet side of compressor 50 to reduce compressor surge under certain operating conditions, such as when an intake throttle 76 is closed. Inlet supply conduit 26 may include a charge air cooler 36 downstream from compressor 50 and intake throttle 76. In another embodiment, a charge air cooler 36 is located in the intake system 22 upstream of intake throttle 76. Charge air cooler 36 may be disposed within inlet air supply conduit 26 between engine 30 and compressor 50, and embody, for example, an air-to-air heat exchanger, an air-to-liquid heat exchanger, or a combination of both to facilitate the transfer of thermal energy to or from the flow directed to engine 30.

In operation of engine system 20, fresh air is supplied through inlet air supply conduit 23. The fresh air flow or combined flows can be filtered, unfiltered, and/or conditioned in any known manner, either before or after mixing with the EGR flow from EGR systems 51, 60 when provided. The intake system 22 may include components configured to facilitate or control introduction of the charge flow to engine 30, and may include intake throttle 76, one or more compressors 50, and charge air cooler 36. The intake throttle 76 may be connected upstream or downstream of compressor 50 via a fluid passage and configured to regulate a flow of atmospheric air and/or combined air/EGR flow to engine 30. Compressor 50 may be a fixed or variable geometry compressor configured to receive air or air and fuel mixture from fuel source 104 and compress the air or combined flow to a predetermined pressure level before engine 30. The charge flow is pressurized with compressor 50 and sent through charge air cooler 36 and supplied to engine 30 through intake supply conduit 26 to engine intake manifold 28.

With further reference to FIG. 2, fueling system 21 is configured to provide multiple types of fuel to engine 30. Only four cylinders 31a, 31b, 31c, 31d are shown in FIG. 2, it being understood that if additional cylinders, such as cylinders 31e and 31f, or fewer cylinders, are provided they are arranged in a manner similar to the illustrated cylinders 31. Fueling system 21 includes first fuel source 102 and second fuel source 104. First fuel source 102 is configured to provide a first fuel type to cylinders 31 via one or more injectors at or near each cylinder. Second fuel source 104 is structured to provide a second fuel type and is connected to intake system 22 with a mixer or connection at or adjacent an inlet of compressor 50. In certain embodiments, the cylinders 31 each include at least one direct injector for delivering fuel to the combustion chamber thereof from a primary fuel source, such as first fuel source 102. In addition, one or more control valves, port injectors and/or mixers can be provided for delivery or induction of fuel from the second fuel source 104 with the charge flow delivered to cylinders 31. Such devices may be electronically controllable and may include one or more actuators for controlling flow of fuel from the second fuel source 104. In certain forms at least one of a port injector at each cylinder or a mixer at an inlet of compressor 50 are provided for delivery or induction of fuel from the second fuel source 104 with the charge flow delivered to cylinders 31.

The first fuel source 102 is controlled to provide the sole fueling at certain operating conditions of engine 30, and fueling from the second fuel source 104 is provided to replace a portion of fuel from the first fuel source 102 at other operating conditions to provide a dual flow of fuel to engine 30. In embodiments where the first fuel source 102 is diesel fuel and the second fuel source 104 is a gaseous fuel. An electronic control system including one or more controllers is structured to control the flow of liquid diesel fuel from first source 102 and the flow of gaseous fuel from second source 104 in accordance with the controls disclosed herein.

A direct injector, as utilized herein, includes any fuel injection device that injects fuel directly into a cylinder, and is capable of delivering fuel into the cylinder when the intake valve(s) and exhaust valve(s) are closed. The direct injector may be structured to inject fuel at the top of the cylinder or laterally of the cylinder. In certain embodiments, the direct injector may be structured to inject fuel into a combustion pre-chamber. Each cylinder 31 may include one or more direct injectors 116a-116d, respectively. The direct injectors 116a-116d may be the primary fueling device for first fuel source 102 for the cylinders 31.

A port injector, as utilized herein, includes any fuel injection device that injects the second fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 31a, 31b, 31c, 31d may include one or more port injectors 118a, 118b, 118c, 118d, respectively. In one embodiment, the port injectors 118a-118d may be the primary fueling device for second fuel source 104 to the cylinders 31. In another embodiment, the second fuel source 104 can be connected to intake system 22 with a mixer 115 at a gaseous fuel connection 114 upstream of intake manifold 28, such as at the inlet of or upstream of compressor 50. A flow control valve 117 can be provided to control the flow of gaseous fuel to engine 30 from second fuel source 104.

In certain embodiments, each cylinder 31 includes at least one direct injector that is capable of providing all of the designed fueling amount from first fuel source 102 for the cylinders 31 at any operating condition. Second fuel source 104 provides a flow of a second fuel to each cylinder 31 through a port injector or a natural gas connection upstream of intake manifold 28 to provide a second fuel flow to the cylinders 31 to achieve desired operational outcomes, such as improved efficiency, improved fuel economy, improved high load operation, and other outcomes.

An electronic control module (ECM) 200 is structured to control operation of a number of aspects of systems 20 and 21, including the provision of and combustion of multiple types of fuel. In certain embodiments, ECM 200 forms a portion of an electronic control system including one or more computing devices having memory, processing, and communication features. ECM 200 may comprise a single device, a distributed device or multiple devices in operative communication with one another. The functions of ECM 200 may be performed by hardware, software, firmware or a combination thereof. Instructions utilized by ECM 200 may be provided on a computer readable storage medium. ECM 200 may communicate with the sensors or actuators of systems 20 and 21 in a variety of manners, including through direct communication, communication over a datalink, and/or through communication with other controllers or portions of the processing subsystem that provide sensor and/or actuator information to ECM 200.

One embodiment of system 20 includes fueling system 21 with at least one fuel source 102 to provide a first fuel flow to all the cylinders 31 and a second fuel source 104 that provides a second fuel flow to all the cylinders 31 in addition to the first fuel flow under certain operating conditions. First fuel source 102 includes a first fuel pump 105 that is connected to ECM 200, and the second fuel source 104 includes, in one embodiment, a second fuel pump 106 that is connected to ECM 200. Each of the cylinders 31 includes an injector, such as direct injectors 116a-116d associated with each of the illustrated cylinders 31a-31d of FIG. 2. Direct injectors 116a-116d are electrically connected with ECM 200 to receive fueling commands that provide a fuel flow to the respective cylinder 31 in accordance with a fuel command determined according to engine operating conditions and operator demand by reference to fueling maps, control algorithms, or other fueling rate/amount determination source stored in ECM 200. First fuel pump 105 is connected to each of the direct injectors 116a-116d with a first fuel line 109. First fuel pump 105 is operable to provide a first fuel flow from first fuel source 102 to each of the cylinders 31a-31d in a rate, amount and timing determined by ECM 200 that achieves a desired power and exhaust output from cylinders 31.

If provided, second fuel pump 106 is connected to the inlet of compressor 50 with gaseous fuel connection 114 with a second fuel line 108 or to port injectors 118. A shutoff valve 112 can be provided in fuel line 108 and/or at one or more other locations in fueling system 21 that is connected to ECM 200. Second fuel pump 106 is operable to provide a second fuel flow from second fuel source 104 in an amount determined by ECM 200 that achieves a desired power and exhaust output from cylinders 31. In another embodiment, second fuel pump 106 is omitted and fuel is supplied to connection 114 or port injectors 118 under pressure from a pressurized second fuel source 104, and the flow of gaseous fuel from second fuel source 104 is controlled by flow control valve 117.

ECM 200 can be connected to actuators, switches, or other devices associated with fuel pumps 105, 106, shutoff valve 112, intake throttle 76, compressor bypass valve 74, shutoff valve 112, flow control valve 117, wastegate 70 and/or injectors 116, 118 and configured to provide control commands thereto that regulate the amount, timing and duration of the flows of the first and second fuels to cylinders 31, the charge flow, and the exhaust flow to provide the desired power and exhaust output. The positioning of each of shutoff valve 112, flow control valve 117, intake throttle 76, compressor bypass valve 74, wastegate 70, injectors 116, 118 and/or the on/off status of fuel pumps 105, 106 can be controlled via control commands from ECM 200.

In other embodiments, a first subset of cylinders 31 is associated with a first cylinder bank (not shown) and a second subset of cylinders 31 is associated with a second cylinder bank. Accordingly, differing substitution rates of the gaseous fuel can be used for the cylinder banks. In certain embodiments of engines with multiple cylinder banks, the feed lines for the gaseous fuel can be separately controlled to each cylinder bank to provide the desired substitution rate of the gaseous fuel for the respective cylinder bank.

In certain embodiments of the systems disclosed herein, ECM 200 is structured to perform certain operations to control engine operations and fueling of cylinders 31 with fueling system 21 to provide the desired operational outcomes. ECM 200 may be in communication with each of the sensors and actuators disclosed herein in a number of manners including, for example, through direct communication, communication over a controller area network, communication over a datalink, and/or through communication with other controllers or portions of the processing subsystem that provide sensor and/or actuator information to the ECM 200.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of multi-fuel internal combustion engines, improvements in engine torque generation and torque control, engine fuel economy performance, improvements in engine noise and vibration control for multi-fuel engines, improvements in performance or operation of aftertreatment systems and/or components of multi-fuel engines, and/or improvements in emissions reduction in multi-fuel engines. Without limitation, example and non-limiting technological fields that are improved include the technological fields of multi-fuel internal combustion engines and related apparatuses and systems as well as vehicles including the same.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 3:
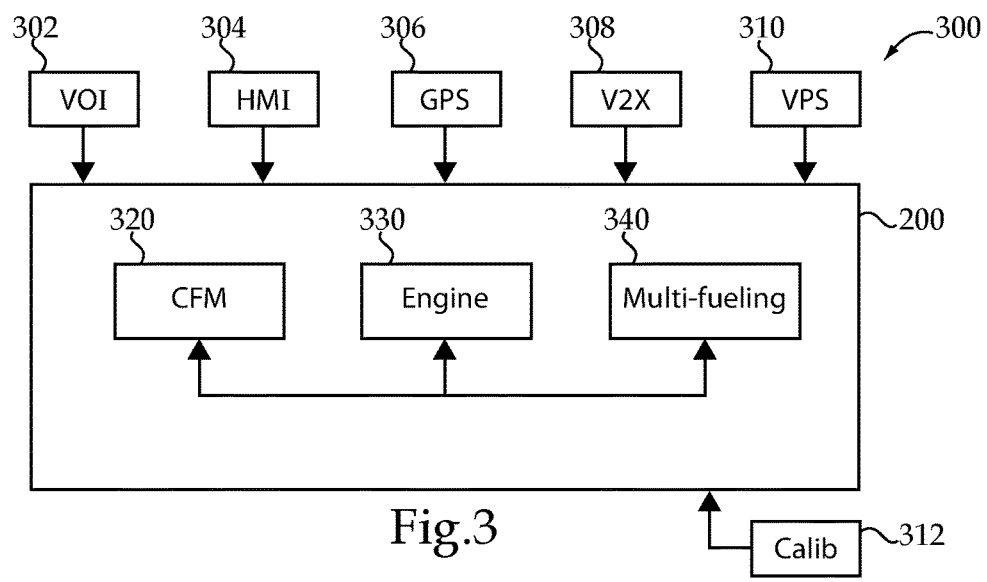
FIG. 3 is a schematic block diagram illustrating an exemplary electronic control system.

With reference to FIG. 3 there is illustrated an exemplary electronic control system 300 which includes ECM 200, vehicle operator input (VOI) system 302, human-machine interface (HMI) system 304, GPS system 306, vehicle-to-X communication (V2X) system 308, vehicle proximity sensor (VPS) system 310, and a calibration interface 312 which supports communication with an electronic system calibration tool. It shall be appreciated that system 302 is an example of a system structured to provide operator input via one or more vehicle controls that is used to control the vehicle. It shall be further appreciated that systems 304, 306, 308, 310 and 312 are examples of systems that are structured to receive information from a source external to a vehicle system which relates to vehicle environment factors, location factors, mission factors, warranty factors (e.g., component residual life, component replacement cost and component replacement time), operator-specified factors, and/or fleet-specified factors. System 300 may also include a number of additional or alternate systems and/or additional or alternate inputs.

VOI system 302 provides information pertaining to vehicle operator control commands to ECM 200. The provided information may include brake pedal position information, accelerator pedal position information, cruise control setting information, and other information provided by a vehicle operator via one or more vehicle control devices or systems. ECM 200 may process the received information to determine additional information including, for example, brake pedal position rate of change information, brake pedal actuation frequency information, accelerator pedal position rate of change information, and accelerator pedal actuation frequency information. In certain embodiments such additional information by be determined by VOI system 302 prior to being provided to ECM 200.

ECM 200 utilize the information received from system 302 in determining commands for controlling various operational aspects of systems 20 and 21, for example, engine control commands, fueling control commands, transmission shift commands, and brake actuation commands, among others. ECM 200 may also utilize the information received from system 302 to determine parameters in a vehicle cost factor module (CFM). The CFM parameters may include, for example, vehicle environment factors, location actors, mission factors, warranty factors, operator-specified factors, and fleet-specified factors. The CFM parameters may include vehicle acceleration or deceleration parameters, road grade parameters, vehicle altitude parameters, ambient temperature parameters, engine idle parameters, traffic condition parameters, road condition parameters, ambient temperature parameters, altitude parameters, mission parameters such as city mission parameters, long-haul mission parameters, low emissions region parameters, low noise region parameters and emissions banking or trading parameters, convoy or platooning parameters, vehicle to vehicle (V2V) route planning parameters, weather route planning parameters, traffic route planning parameters, emissions credit banking and trading parameters, load management parameters, customer preference parameters, fleet operator preference parameters, and other parameters relating to the vehicle environment, location, mission service life, operator settings and/or fleet settings. ECM 200 may utilize the information received from system 302 and the CFM to make predictions about one or more future conditions relating to the vehicle environment, location and mission including, for example, future vehicle velocity, acceleration, stopping and idle conditions as well as future conditions of any of the parameters accounted for by the CFM.

HMI system 304 includes a human-machine interface through which a vehicle operator or another person may provide additional information from a source external to the vehicle system. The human-machine interface may comprise a touch screen display, keypad or other device through which information may be input. The human-machine interface may also comprise a wireless communication system allowing a person remote from the vehicle to input information. The provided information may include information relating to the existence and/or duration of extended idle conditions, mission performance parameters (e.g., mission route, mission length, length or duration of certain mission activities, platooning or convoying opportunities, route planning, and weather or traffic planning), requirements for shore power (e.g., auxiliary power unit (APU) devices such as no-idle climate control systems or other power take off (PTO) devices), among other information. The provided information may include information related to warranty factors including, for example, residual life of one or more components, replacement cost for one or more components, and replacement time for one or more components. The provided information may include information related to operator-specified factors including, for example, fuel cost, diesel exhaust fluid (DEF) cost, fuel and/or DEF availability, fuel and/or DEF supply or purchase agreements, sociability constraints, peak performance requests, and on/off-road use, among others. The provided information may include information related to fleet-specified factors including, for example, emissions banking and credit trading, load management, and customer or fleet operator preferences. ECM 200 may utilize the information provided by system 302 to determine corresponding parameters in a vehicle CFM as well as predictions of future conditions for such parameters.

GPS system 306 provides information pertaining to vehicle location to ECM 200. The vehicle location information may be received by a receiver of system 306 as a wireless signal from a satellite-based global positioning system. The received information may be provided to ECM 200 in the form received or may be pre-processed to decode or change the format or organization of the received information. ECM 200 may utilize the information received from system 306 to determine corresponding parameters in a vehicle cost factor module, for example, vehicle location, vehicle altitude and road grade, as well as predictions of future conditions for such parameters.

V2X system 308 provides information received from one or more external sources to ECM 200. The information may be received by a receiver or transceiver of system 308 as a wireless communication signal from a variety of different sources equipped with a wireless transmitter or transceiver including, for example, other vehicles, traffic lights and other traffic signals, utility grid devices or systems, stationary transceivers in communication with other communication networks and remote servers or human-staffed computing systems also in communication with the other communication networks. The provided information may include information related to road or traffic signal conditions, information related to weather conditions, information related to warranty factors including, for example, component residual life, component replacement cost and component replacement time, information related to operator-specified factors including, for example, fuel cost, DEF cost, fuel availability, fuel agreements, sociability constraints, peak performance requests, on/off-road use, information related to fleet-specified factors including, for example, emissions banking and credit trading, load management, and customer or fleet operator preferences. ECM 200 may utilize the information received from system 308 to determine parameters in a vehicle cost factor module such as acceleration, deceleration, stopping, idle events, emissions requirements, fueling opportunities, fuel prices, opportunities for banking or trading of emissions credits, as well as predictions of future conditions for such parameters.

V2X system 308 may be utilized in connection with intelligent transport systems (ITS) which comprise systems that integrate information and communication technologies with transport infrastructure to improve economic performance, safety, mobility and environmental sustainability. An exemplary ITS system includes three operational layers: a data collection layer, a data aggregation and translation layer and an information dissemination layer. The data collection layer may include one or more elements of electronic control system 300 as well as devices and systems on a plurality of vehicles which sense and transmit data associated in a plurality of vehicles at particular geographical locations. The data collection layer may further include sensors, cameras and other data sources which are fixed relative to a roadway, or information from sensors, cameras and other data sources which are provided on surveillance vehicles such as planes and helicopters.

The data aggregation and translation layer comprises one or more computer based systems which receive and aggregate data from the data collection layer devices and process the received data to provide information about one or more roadway or traffic conditions. In certain aspect, the received data may include information about road grade, vehicle rate of speed, or change in rate of speed at particular locations which may be aggregated and processed to determine traffic speed over a given segment of roadway. In other aspects, information about weather conditions such as wind speed, precipitation and road conditions may be derived.

The information dissemination layer may include one or more elements of electronic control system 300 as well as devices and systems on a plurality of vehicles which receive information transmitted from the data aggregation and translation layer. The received information may include road grade information, information about traffic speed over a given segment of roadway, as well as information about weather conditions such as wind speed, precipitation and road conditions may be derived. ITS information from one or more of the foregoing layers may be received by system 308 and provided to ECM 200.

Proximity sensor system 310 provides information pertaining to other vehicles or objects within a sensor range to the vehicle to ECM 200. The provided information may include distance to one or more vehicles or objects in sensor range, velocity of one or more vehicles or objects in sensor range and acceleration of one or more vehicles or objects in sensor range. ECM 200 may utilize the information received from system 302 to determine parameters in a vehicle cost factor module such as road conditions, traffic conditions, vehicle velocity, acceleration, stopping and idle, as well as predictions of future conditions for such parameters.

ECM 200 includes vehicle cost factor module (CFM) controller 320, engine controller 330 and multi-fueling controller 340 which are each in operative communication with one another. It shall be appreciated that controllers 320, 330 and 340 may be implemented in a single control system component or multiple control system components depending on the form in which ECM 200 is provided. ECM 200 may also include additional or alternate controllers including, for example, transmission controllers, aftertreatment system controllers and vehicle system controllers, among others. ECM 200 is structured to provide one or more inputs received from systems 302, 304, 306, 308, 310 and 312 to one or more of controllers 320, 330 and 340.

CFM controller 320 may be structured to maintain and update a vehicle model including parameters accounting for a plurality of vehicle conditions including, for example, geographical location, altitude, road grade, ambient temperature, velocity, acceleration, local emissions regulations, and route of vehicle mission, among others. CFM controller 320 may be structured to prognosticate or predict a plurality of future vehicle model conditions including, for example, acceleration or deceleration events, future road grade, future altitude, future temperature, future idle events and future mission route changes, among others. CFM controller 320 may be structured to perform a cost optimization to generate outputs that modify the operation of other controllers such as engine controller 330 and multi-fueling controller 340.

The cost optimization performed by CFM controller 320 may utilize the current state of the vehicle model, for example, by accounting for an effect of acceleration or deceleration events, future road grade, future altitude, future temperature, future idle events and future mission route changes on fuel consumption, reductant consumption, or vehicle component wear. The cost optimization may utilize a predicted future state of the vehicle model, for example, by accounting for an effect of future acceleration or deceleration events, future road grade, future altitude, future temperature, future idle events and future mission route changes on fuel consumption, reductant consumption, or vehicle component wear. The cost optimization may further utilize information of the various cost factors disclosed herein (e.g., fuel cost, replacement part cost or reductant cost) as inputs to the optimization.

It shall be appreciated that CFM controller 320 is one example of a controller that is structured to receive and process ex-vehicle inputs (e.g., inputs from sources external to the vehicle system such as V2X) and to generate cost optimization outputs responsive to the ex-vehicle inputs. A variety controllers with additional and alternate features are also contemplated as would occur to one of skill in the art with the benefit of the present disclosure.

Engine controller 330 may be structured to control a number of aspects of the operation of engine 30 and other associated elements of systems 20 and 21 including, for example, air handling, provision of a first fuel type and exhaust aftertreatment, among others. In certain embodiments, the first fuel type is diesel fuel and engine controller 330 is structured to control provision of the first fuel type using closed loop PI controls which determine diesel combustion parameters to achieve a target engine speed, torque or power. The diesel combustion parameters may include charge flow, EGR fraction, turbocharger boost pressure, turbine geometry, total fueling, number of injection pulses, timing of injection pulses, distribution of fuel quantity among multiple injection pulses, injector rail pressure, and/ or other parameters influencing combustion.

Engine controller 330 may be structured to control operation of engine system 20 and fueling system 21 in a diesel fuel mode in which diesel fuel is the primary or sole fuel supplied to the engine 30, engine control 330 may reference one or more fueling tables, maps, models, control algorithms, or other fueling rate/amount determination sources (collectively "diesel fuel table") to determine one or more fuel injection parameters. For example, engine control 330 may reference the diesel fuel table, to determine one or more injection parameters relating to the timing, amount, and/or pressure at which diesel fuel is to be injected into the combustion chambers by the fuel injectors 116. The determined injection parameter(s) may then be used by engine control 330 to control the operation of the engine system 20, including the dual source fueling system 21, in at least an attempt to attain desired torque and/or exhaust output from the engine system 20. For example, the engine control 330 may use the determined injection parameter to provide commands associated with the timing and duration at which the fuel injectors 116 are to inject diesel fuel into the combustion chambers.

It shall be appreciated that engine controller 330 is one example of a controller that is structured to receive and process inputs from vehicle operator controls (e.g., accelerator, brake, gear change and other inputs from operator control devices) and to generate engine control outputs responsive to the operator inputs. A variety controllers with additional and alternate features are also contemplated as would occur to one of skill in the art with the benefit of the present disclosure.

A substation rate or amount of a second fuel type may be determined by other control elements such a multi-fueling controller 340. Engine controller may not have information of the substitution rate or amount but may still regulate diesel combustion parameters without this information, for example, using closed loop PI or PID controls which vary certain diesel combustion parameters based upon the feedback condition (e.g., engine speed, torque, power, etc.).

Multi-fueling controller 340 may be structured to provide one or more control outputs influencing the provision of one or more fuels for combustion by an engine. In certain embodiments multi-fueling controller 340 is structured to determine a substitution rate for replacing a portion of a diesel fuel type with a second fuel type. As noted above, in certain forms the diesel fuel is diesel fuel the provision of which may be controlled by engine controller 330. In certain forms the second fuel is a gaseous fuel such as natural gas or the other gaseous fuel types disclose herein. Multi-fueling controller 340 may be structured to determine a gaseous fuel substitution rate based upon a one or more engine operating parameters as well as by information provided by CFM controller 320. The engine operating parameters may include, for example, air-to-fuel ratio (AFR) information for the first fuel type, engine load, engine speed and other factors influencing the multi-fuel combustion, including, for example, any of the aforementioned plurality of CFM parameters and/or any of the aforementioned plurality of future conditions which are prognosticated or predicted.

Multi-fueling controller 340 may be structured to control in part operation of engine system 20 and fueling system 21 in a dual-fuel mode such that a combination of diesel fuel and gaseous fuels are supplied to the engine 30, controller 340 may reference one or more fueling tables, maps, models, control algorithms, or other fueling rate/amount determination sources (collectively "dual-fuel table") to determine injection parameters for the diesel fuel while the engine system 20 is operating in the dual-fuel mode. Similar to the diesel fuel table, the dual-fuel table may be utilized to determined injection parameter(s) that are used by the controller 150 to control the operation of the engine system 20, including the dual source fueling system 21, in at least an attempt to attain desired torque and/or exhaust output from the engine 30, including, for example, operation parameters relating to the injection of diesel fuel into the combustion chambers by the fuel injectors 116.

It shall be appreciated that multi-fueling controller 340 is one example of a controller that is structured to receive and process vehicle system condition inputs (e.g., intake pressure, temperature, flow rate, humidity, cylinder pressure, exhaust pressure and flow rate and other inputs pertaining the operating conditions of the engine and vehicle) and to generate a second set of engine control outputs responsive to the vehicle system condition inputs. A variety controllers with additional and alternate features are also contemplated as would occur to one of skill in the art with the benefit of the present disclosure.

One or more of the controllers of ECM 200 may be utilized in performing a cost function optimization. It shall be appreciated that the terms cost function optimization and cost optimization as used here refer to and encompass optimization of costs and cost functions encompassing a number of different parameters and units, including, but not limited to, parameters and units of financial/currency costs (e.g., dollar), parameters and units of physical or consumption cost (e.g., mass, volume, etc.), and parameters and units of efficiency cost (e.g., percent efficiency), as well as other defined parameters and units of cost and/or benefit. In certain embodiments CFM controller 320 may perform the cost optimization alone. In certain embodiments both CFM controller 320 and multi-fueling controller 340 may operate together to perform the cost optimization. Other combinations of controllers are also contemplated. Regardless of which controllers participate in cost function optimization, a plurality of cost factors may be optimized concurrently or in sequence. A number of techniques may be utilized in this optimization. Lookup tables may be utilized and may include real time mappings based on prior characterizations. Simple adaptive models may be utilized to key-in on a selected number of factors to find an association which can be utilized in optimization. Neural networks may be utilized which have pre-learned associations to provide rapid optimization assessments. System ID approaches may be utilized to provide a mathematical models that is tuned in real time to determine convergence of unknown coefficients based on streaming data.

It shall be appreciated that CFM controller 320, engine controller 330, and multi-fueling controller 340 provide one example of controllers that are structured to operate concurrently (e.g., in parallel or in interleaved sequence) to control the engine to combust variable proportions of the first fuel type and the second fuel type in response to operator controls inputs, vehicle system condition inputs, and ex-vehicle inputs. By way of further example, in certain embodiments the vehicle system condition inputs may comprise air-to-fuel ratio information for the first fuel type and the second set of engine control outputs comprise a substitution rate for the second fuel type. The substitution rate may be determined by selecting and utilizing one of a plurality of substitution rate lookup tables configured with respective sets of predetermined substitution rates. The cost optimization outputs of CFM controller 320 may be structured to vary the selection and utilization of one of the plurality of substitution rate lookup tables. Ex-vehicle inputs comprise cost information for the first fuel type and the second fuel type at a geographic location along a travel route of the vehicle. The cost optimization outputs may be structured to vary the selection and utilization of one of the plurality of lookup tables responsive to optimized cost between the first fuel type and the second fuel type.

The cost optimization outputs described herein may result in selection of substitution rate tables that are more aggressive (i.e., provide for greater substitution of the second fuel type) when the cost optimization indicates that increases consumption of the second fuel type minimizes cost as determined by the optimization. The cost optimization may alternatively result in selection of substitution rate tables that are less aggressive (i.e., provide for less substitution of the second fuel type) when the cost optimization indicates that decreased consumption of the second fuel type or increased consumption of the first fuel type minimizes cost as determined by the optimization. It shall be further appreciated that the fuel-type optimization provides only one example of cost optimization influence on substitution rate decisions. Certain embodiments additionally or alternatively include cost optimizations respecting consumption of exhaust aftertreatment system reductant, impact on vehicle component lifespan and any of the other cost factors disclosed herein. It is further contemplated that the vehicle operator may provide input that varies the weighting of coast factors being optimized, for example, to prefer performance over cost minimization, or to prefer certain cost factors over others. Such information may also be transmitted from sources external to the vehicle system, for example, from a centralized control center managing a fleet of vehicles.

Figure 4:
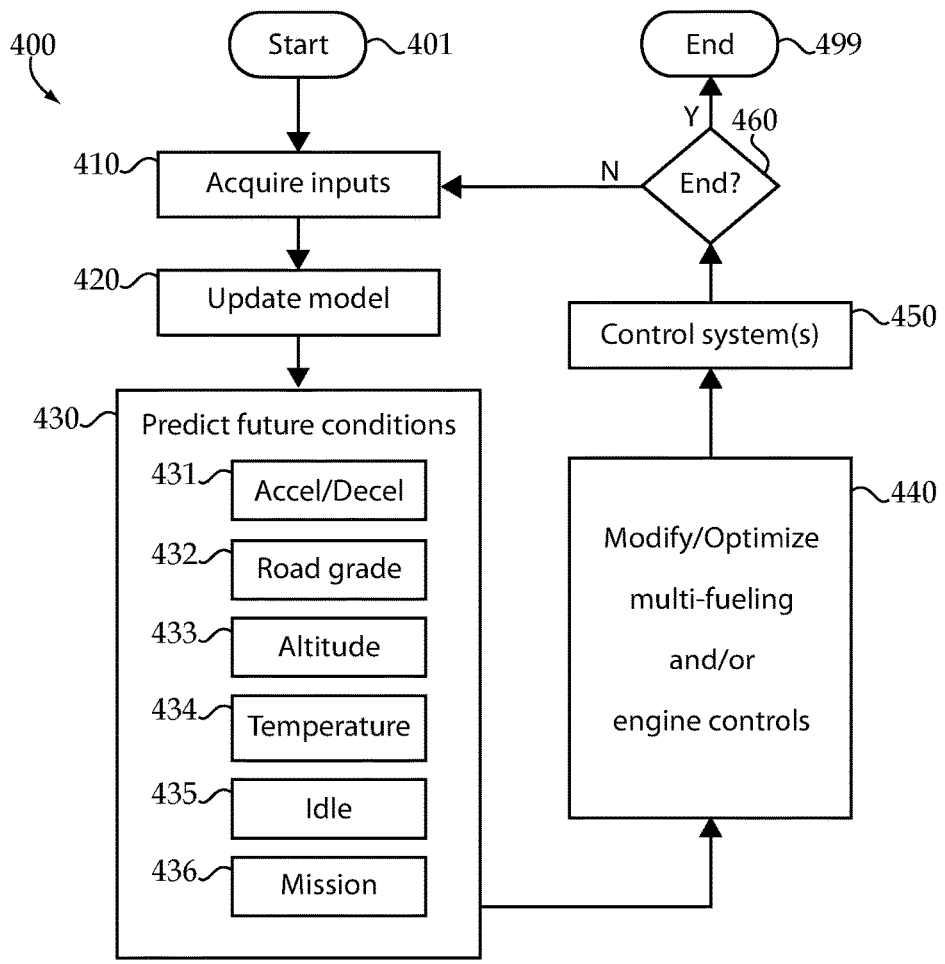
FIG. 4 is a flow diagram illustrating an exemplary control process.

With reference to FIG. 4 there is illustrated a flow diagram of an exemplary control process 400. Process 400 may be implemented in and executed by on one or more modules of an electronic control system, for example, ECM 200. Process 400 starts at operation 401 and proceeds to operation 410 which acquires cost factor inputs. The acquired inputs may include, for example, the information provided by systems 302, 304, 306, 308, 310 and 312 described above.

From operation 410 process 400 proceeds to operation 420 which updates one or more CFM parameters based at least in part upon the cost factor inputs acquired by operation 410. The updated parameters may comprise vehicle acceleration or deceleration, road grade, altitude, ambient temperature, engine idle and mission parameters, as well as any of the parameters described above in connection with CFM controller 320.

From operation 420 process 400 proceeds to operation 430 which predicts one or more future cost factor conditions. In the illustrated embodiment, operation 430 is structured to predict one or more of a future acceleration or deceleration condition 431, a future road grade condition 432, a future altitude condition 433, a future temperature condition 434, a future idle condition 435, and a future mission condition 436, as well as any of the any of the predicted future conditions described above in connection with CFM controller 320. In certain embodiments, a plurality of cost factors may be optimized in parallel. A number of techniques may be utilized in this regard. Lookup tables may be utilizes and may include real time mappings based on prior characterizations. Simple adaptive models may be utilized to key-in on a selected number of factors to find an association which can be utilized in optimization. Neural networks may be utilized which have pre-learned associations to provide rapid optimization assessments. System ID approaches may be utilized to provide a mathematical models that is tuned in real time to determine convergence of unknown coefficients based on real time streaming data.

From operation 430 process 400 proceeds to operation 440 which modifies one or both of multi-fuel controls and engine controls based upon the one or more predicted future cost factor conditions from operation 430. The modification may include modification of a second fuel substitution rate as well as other modifications effective to influence which of a plurality of fuels are provided for combustion, in what quantities or proportions, and when each of the plurality of fuels is provided.

From operation 440 process 400 proceeds to operation 450 which control the operation of an engine system and a fueling system, such as systems 20 and 21, based upon the modified controls from operation 440. From operation 450 process 400 proceeds to conditional 460 which evaluates whether an end condition is true. If conditional 460 determines that the end condition is true, process 400 proceeds to end operation 499. If conditional 460 determines that the end condition is not true process 400 proceeds to operation 410.

Figure 5:
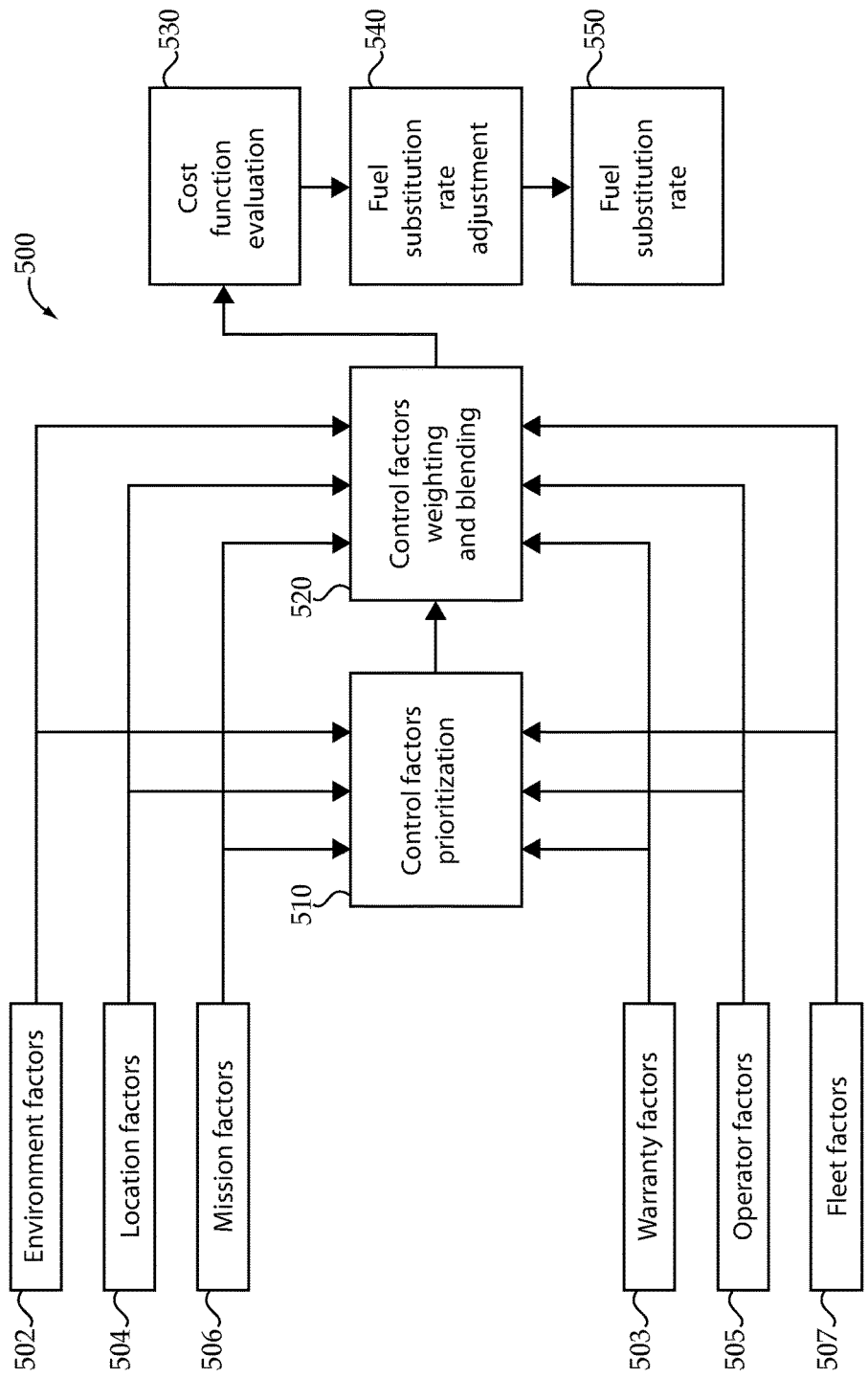
FIG. 5 is a schematic block diagram illustrating controls.

With reference to FIG. 5 there is illustrated a schematic block diagram of exemplary cost optimization controls 500. In the illustrated embodiment, controls 500 include environment factors 502, location factors 504, mission factors 506, warranty factors 503 operator-specified factors 505, and fleet-specified factors 507 as inputs (collectively, "factors 502-507"). It is further contemplated that additional or alternate cost factor inputs may be provided. Environment factors 502 may include the environment-related parameters and/or predictions from the CFM described above including, for example, those respecting traffic condition, vehicle acceleration and deceleration, ambient temperature and others. Location factors 504 may include the location-related parameters and/or predictions from the CFM described above including, for example, those respecting geographic position and altitude. Mission factors 506 may include the mission-related parameters and/or predictions from the CFM described above including, for example, those respecting convoy or platooning opportunities, V2V route planning, weather route planning, and traffic route planning. Warranty factors 503 may include warranty-related parameters and/or predictions from the CFM described above including, for example, those respecting component residual life, component replacement cost and component replacement time. Operator-specified factors 505 may include the vehicle operator related factors and/or predictions from the CFM described above including, for example, those respecting cost of fuel, cost of diesel exhaust fluid DEF, taxes, availability of fuel, availability of DEF, supplier agreements relating to fuel and/or DEF, sociability constraints, peak performance requirements, and use type, (e.g., on road vs off road use). Fleet-specified factors 507 may include the vehicle fleet related factors and/or predictions from the CFM described above including, for example, those respecting emissions credit banking and trading, load management, customer preferences and fleet operator preferences.

Each of factors 502-507 is provided to control factors prioritization block 510 and control factors weighting and blending block 520. Block 510 is structured to prioritize the factor inputs it receives. The prioritization may be linear or non-linear. Block 520 is structured to weight and blend or combine the factor inputs it receives. The weighting and/or blending may be linear or non-linear. The output of block 510 and 520 are provided to bock 530 which evaluates a cost function for the control factors using the prioritization, weighting and blending information and outputs the resulting value(s). It shall be appreciated that the cost function optimization techniques disclosed herein may be utilized by or in connection with block 530. The output of block 530 is provided to block 540 which determines a fuel substitution rate adjustment and outputs an outputs adjustment information. The output of block 540 is provided to block 550 which adjusts the fuel substation rate based upon the adjustment information.

Several non-limiting examples of particular controls shall now be further described. It shall be appreciated that these controls may be implemented in connection with ECM 200 and controllers 320, 330 and 340, control process 400 and/or controls 500, as well as in connection with other electronic control system components and processes.

In certain embodiments, owner, operator and/or mission specific calibration information is provided via a calibration interface. The customized calibration information is configured to influence multi-fueling parameter such as a substitution rate of a second fuel type for a first fuel type based on the particular requirements of an owner, operator, and/or mission. These requirements may be pre-determined based on head office analysis and may be uploaded via a physical or wireless connection during a re-calibration operation. In certain exemplary controls, active performance monitoring and diagnostics may be performed during vehicle operation which may be used to later select or vary calibrations or to do so dynamically during vehicle operation.

In certain embodiments, vehicle load management is provided. An external source of information provides a cargo trajectory for a given cargo unit. The cargo trajectory includes a route and a delivery device selected from various routes and delivery devices in order to improve the outcome of or optimize a cost function.

In certain embodiments, vehicle to vehicle (V2V) convoy optimization is provided. The convoy optimization may include either or both of parasitic and cooperative events for multi-vehicle tandem operation. Such events include convoy operation, drafting, and platooning. A fuel substitution rate may be changed based upon a cost optimization accounting for these factors.

In certain embodiments V2X route planning cost optimization is provided. The route planning optimization may include either or both of load pooling and tandem operation cost factor optimizations to provide a cost optimization that determines a route factoring in terrain, weather, time-of-day, stopping points for unload/reload, and fuel substitution rate.

In certain embodiments V2X fuel substitution rate optimization may be utilized. The operational or mission cost may include suitable V2X behaviors such as convoy, drafting or platooning operation. Information determined through back office data mining of be used through V2X mechanisms to determine the optimal fuel substation rate setpoints for a given operator driving style. Real time adjustments may be conducted on-board while slower macro changes may be conducted off-board. When a suitable opportunity for V2V decision making comes up to reduce operational or missions cost, then this may impact the fuel substitution rate. For example, a platooning opportunity would impact the ram air and consequently the ability for the engine to cool itself passively. Changing the fuel substitution rate may directly impact the engine operating temperature, that may provide an extended operating state without the need for active cooling (i.e. use of engine fan). A cost function may be provided to optimize this parameter based on the V2V condition impact on individual vehicle operation.

In certain embodiments warranty prognostics may be utilized. For example, the operational or missions cost may include component warranty prognostics. When a component is indicating near-end-of-useful-life, mission optimization may change the fuel substitution rate to reduce the impact of the failing/failed component. For example when selecting between a diesel and non-diesel fuel systems (e.g., diesel and gasoline, or diesel and gaseous fuel), the use of non-diesel fuel may be weighted to increase service time of a DPF that is exhibiting end-of-useful-life conditions While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:
1. A vehicle system comprising:
a multi-fuel reciprocating piston engine structured to selectably combust a plurality of proportions of a first fuel type and a second fuel type;
an electronic communication system structured to receive information from a source external to the vehicle; and
an electronic control system in operative communication with the multi-fuel reciprocating piston engine and the electronic communication system;
wherein the electronic control system is structured to control a provision of the first fuel and the second fuel to the multi-fuel reciprocating piston engine using a cost factor optimization which is based at least in part upon external information received from a source external to the vehicle system by the electronic communication system.

2. The vehicle system of claim 1 wherein the electronic control system is structured to control a substitution rate of the second fuel type for the first fuel type based at least in part upon the external information received by the electronic communication system.

3. The vehicle system of claim 1 wherein the first fuel type comprises liquid fuel injected into a cylinder of the multi-fuel reciprocating piston engine and the second fuel type comprises gaseous fuel provided to the cylinder with the intake charge.

4. The vehicle system of claim 1 wherein the cost factor optimization is structured to concurrently optimize a plurality of factors including one or more of component service life factors, route optimization factors, vehicle load optimization factors, fueling cost factors, and vehicle operational state factors.

5. The vehicle system of claim 1 wherein the electronic control system is structured to predict one or more future vehicle conditions and to control the provision of the first fuel and the second fuel to the multi-fuel reciprocating piston engine based at least in part upon the one or more predicted future vehicle conditions.

6. The vehicle system of claim 5 wherein the one or more future vehicle conditions comprise one or more of an acceleration condition, a deceleration condition, a road grade condition, an altitude condition, an ambient temperature condition, an engine idle condition, a traffic condition, and a road condition.

7. The vehicle system of claim 1 wherein the information received by the communication system from the source external to the vehicle is transmitted wirelessly to the vehicle.

8. A method of operating a vehicle including a reciprocating piston engine operable to combust variable proportions of a first fuel type and a second fuel type, the method comprising:
   operating the reciprocating piston engine to combust a first proportion of the first fuel type and the second fuel type;
   wirelessly receiving information from a source external to the vehicle;
   performing with a control system a cost factor optimization using a plurality of cost factors including one or more cost factors responsive to the received external information;
   determining with the control system a second proportion of the first fuel type and the second fuel type in response to the cost factor optimization; and
   operating the reciprocating piston engine to combust the second proportion of the first fuel type and the second fuel type.

9. The method of claim 8 wherein the cost factor optimization is structured to perform a weighted optimization of one or more first cost factors for vehicle equipment replacement and one or more second cost factors for consumption of the first fuel type or the second fuel type.

10. The method of claim 9 wherein at least one of the first cost factors and the second cost factors utilizes the received external information.

11. The method of claim 10 wherein the received external information comprises information of the cost of one or more of the first fuel type, the second fuel type, and the vehicle equipment replacement at a future geographic location along a travel route of the vehicle.

12. The method of claim 8 wherein the cost factor optimization is structured to perform a weighted optimization of one or more first cost factors for vehicle exhaust emissions and one or more second cost factors for consumption of a reductant by an aftertreatment structured to receive and treat exhaust received from the reciprocating piston engine.

13. The method of claim 12 wherein at least one of the first cost factors and the second cost factors is responsive to the received external information.

14. The method of claim 13 wherein the external information comprises information of the regulatory cost of vehicle exhaust emissions and a reductant cost at a geographic location along a travel route of the vehicle.

15. An electronic control system adapted for controlling operation of a vehicle including a reciprocating piston engine operable to combust variable proportions of a first fuel type and a second fuel type, the system comprising:
   a first controller structured to receive and process operator controls inputs and to generate a first set of engine control outputs responsive to the operator inputs, the first set of engine control outputs being adapted to control fueling of the first fuel type;
   a second controller structured to receive and process vehicle system condition inputs and to generate a second set of engine control outputs responsive to the vehicle system condition inputs, the second set of engine control outputs being adapted to control fueling of the second fuel type; and
   a third controller structured to receive and process ex-vehicle inputs and to generate cost optimization outputs responsive to the ex-vehicle inputs, the cost optimization outputs being adapted to influence at least one of the first set of engine control outputs and the second set of engine control outputs;
   wherein the first controller, the second controller and the third controller are structured to operate concurrently to control the reciprocating piston engine to combust variable proportions of the first fuel type and the second fuel type in response to the operator controls inputs, the vehicle system condition inputs, and the ex-vehicle inputs.

16. The apparatus of claim 15 wherein the vehicle system condition inputs comprise air-to-fuel ratio information for the first fuel type and the second set of engine control outputs comprise a substitution rate for the second fuel type.

17. The apparatus of claim 16 wherein the substitution rate is determined by selecting and utilizing one of a plurality of substitution rate lookup tables configured with respective sets of predetermined substitution rates.

18. The apparatus of claim 17 wherein the cost optimization outputs are structured to vary the selection and utilization of one of the plurality of substitution rate lookup tables.

19. The apparatus of claim 18 wherein the ex-vehicle inputs comprise cost information for the first fuel type and the second fuel type at a geographic location along a travel route of the vehicle.

20. The apparatus of claim 19 wherein the cost optimization outputs are structured to vary the selection and utilization of one of the plurality of lookup tables responsive to optimized cost between the first fuel type and the second fuel type.

* * * * *